(12) United States Patent
Maciocci (10) Patent No.: US 9,239,661 B2
(45) Date of Patent: Jan. 19, 2016

(54) METHODS AND APPARATUS FOR DISPLAYING IMAGES ON A HEAD MOUNTED DISPLAY

(71) Applicant: QUALCOMM Incorporated, San Diego, CA (US)

(72) Inventor: Giuliano Maciocci, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 13/833,019

(22) Filed: Mar. 15, 2013

(65) Prior Publication Data

US 2014/0282144 A1    Sep. 18, 2014

(51) Int. Cl.
*G06F 3/0481* (2013.01)
*H04N 13/04* (2006.01)
*G02B 27/01* (2006.01)

(52) U.S. Cl.
CPC ............ *G06F 3/0481* (2013.01); *H04N 13/044* (2013.01); *G02B 27/0172* (2013.01); *G02B 2027/0134* (2013.01); *G02B 2027/0178* (2013.01)

(58) Field of Classification Search
CPC ......................... G02B 27/017; H04N 13/0456
USPC ........................................................ 715/765
See application file for complete search history.

(56) References Cited

U.S. PATENT DOCUMENTS

| | | | |
|---|---|---|---|
| 8,159,529 B2 | 4/2012 | Yoshida et al. | |
| 8,184,068 B1 | 5/2012 | Rhodes et al. | |
| 2003/0037449 A1 | 2/2003 | Bani-Hashemi et al. | |
| 2003/0063132 A1 | 4/2003 | Sauer et al. | |
| 2008/0198219 A1 | 8/2008 | Yoshida et al. | |
| 2010/0053069 A1 | 3/2010 | Tricoukes et al. | |
| 2011/0137156 A1 | 6/2011 | Razzaque et al. | |
| 2013/0335303 A1 | 12/2013 | Maciocci et al. | |

FOREIGN PATENT DOCUMENTS

EP    2364032 A2    9/2011

OTHER PUBLICATIONS

International Search Report and Written Opinion—PCT/US2014/026118—ISA/EPO—May 27, 2014.

*Primary Examiner* — Omar Abdul-Ali
(74) *Attorney, Agent, or Firm* — Muncy, Geissler, Olds & Lowe, P.C.

(57) ABSTRACT

System and methods are disclosed to selectively project individual UI elements of display images from stereoscopic HMDs as monocular or stereoscopic images. An UI element may be tagged for rendering as a monocular image or as stereoscopic images with a stereo separation to create a perception of depth. Tagging of UI elements as monocular images or stereoscopic images may be based on whether the UI elements are persistent elements. Persistent elements present information to the user but do not require the user's focused attention. Persistent elements may be rendered as monocular images to allow the user to focus on other UI elements or on the real world while maintaining awareness of information presented by the persistent elements. In contrast, non-persistent UI elements may require the user's focused attention. Non-persistent UI elements may be rendered as stereoscopic images for projection at a specific depth plane to invite the user's focus.

54 Claims, 6 Drawing Sheets

Flowchart for a HMD to selectively display User Interface (UI) elements as monocular or stereoscopic images FIG. 1
Head Mounted Display (HMD) connected to a mobile device FIG. 2A
Flowchart for tagging and rendering
User Interface (UI) elements FIG. 2B
Flowchart for a HMD to selectively display User Interface (UI) elements as monocular or stereoscopic images FIG. 3
Field of view of display to the dominant eye (right eye)

FIG. 4
Field of view of display to the left eye

FIG. 5
Block diagram of a computer system

METHODS AND APPARATUS FOR DISPLAYING IMAGES ON A HEAD MOUNTED DISPLAY

TECHNICAL FIELD

This application generally relates to image display systems. In particular, this application relates to methods and systems for displaying images in display systems worn by users.

BACKGROUND

See-through head mounted displays (HMD) enable displays of computer-generated images on a display medium mounted a few inches in front of the eyes of a HMD-wearing user. A HMD may be incorporated into a pair of glasses or a helmet worn by the users. A user may view videos, receive information, and interact with a display with minimal obstruction to the user's field of view of the real world. HMDs are increasingly being found in augmented-reality devices. See-through HMDs may be monocular or stereoscopic. A monocular HMD displays a single image of the display. On the other hand, a stereoscopic HMD displays an object stereoscopically by projecting a left-eye and a right-eye image of the object independently to create a perception of depth to the user. The stereo separation of the left-eye and right-eye images may be increased or decreased to project the digitally projected images at a specific depth plane.

Frequently, however, a HMD-wearing user may focus on a depth plane not coinciding with the depth plane at which the currently displayed images are being projected. When this happens, eye separation artifacts between the left-eye and the right-eye images may be perceptible, leading to a double vision effect. For example, if an image such as an user interface (UI) element is stereoscopically projected at a depth plane of three feet, but the user is focusing on infinity while walking, the UI element may appear doubled and out of focus. Such a double vision effect is not only unpleasant but may also lead to eye strain or fatigue, thereby detracting from the overall experience of the HMD-wearing user. As such, there is a need for a solution to mitigate the double vision effect experienced by HMD-wearing users when the users focus on a depth plane different from the one at which stereoscopic images are being projected.

SUMMARY

System and methods are disclosed to selectively project individual UI elements of display images from stereoscopic HMDs as monocular or stereoscopic images to mitigate the double vision effect experienced when HMD-wearing users focus on a depth plane different from the one at which stereoscopic images are being projected. The display image from a stereoscopic HMD may comprise of individual user interface (UI) elements. An individual UI element may be tagged for rendering for only one eye of the user so as to generate a monocular image of the UI elements. For example, UI elements characterized as persistent elements may be rendered as monocular images. Persistent UI elements are elements that do not require the user's focused attention, but maybe displayed to the user without interfering with the need for the user to remain mobile and situationally aware. Persistent UI elements may include status information such as a current time, date, battery level of the HMD, etc. Thus, a user may walk around and maintain a gaze focused towards the middle distance or infinity while persistent UI elements are rendered as monocular images. Because monocular images do not introduce the double vision effect seen with stereoscopic images, the user may remain focused on the real world or on a different part of the display without suffering eye fatigue. To further improve the user experience, a user may configure the HMD to display the monocular images to the user's dominant eye.

UI elements not characterized as persistent elements may be tagged for rendering for both eyes so as to generate stereoscopic images of these UI elements. These elements may require the user's focused attention so that the user is not likely to look past the elements to focus on a different depth plane. For example, navigable UI elements, video streams, or interactive elements that the user will be focusing on may be rendered as stereoscopic images. The HMD may simultaneously display monocular images for persistent UI elements and stereoscopic images for other elements. The HMD may also have the flexibility to switch between rendering an UI element as a monocular image or as stereoscopic images as the environment of the user or the context in which the UI elements are displayed changes.

A method for displaying images for a HMD is disclosed. The method includes generating UI elements for an image from an application. The method also includes tagging an UI element as a non-persistent element or as a persistent element based on whether the UI element requires a HMD-worn user's focused attention. The method further includes rendering the UI element as stereoscopic images or as a monocular image based on whether the UI element is tagged as a non-persistent element or as a persistent element.

An apparatus for displaying images is disclosed. The apparatus includes a memory, and one or more processors that read the memory and are configured to display the images. The processors are configured to generate UI elements for an image. The processors are also configured to examine a tag associated with one of the UI elements to determine if the UI element is tagged as a non-persistent or a persistent element. The processors are further configured to render the UI element as stereoscopic images or as a monocular image based on whether the UI element is tagged as a non-persistent element or as a persistent element.

A non-transitory computer-readable medium that stores machine-readable instructions for execution by processors are disclosed. The processors read the instructions to perform steps for displaying images. The instructions include steps to generate UI elements for an image. The instructions further include steps to examine a tag associated with one of the UI elements to determine if the UI element is tagged as a non-persistent or a persistent element. The instructions further include steps to render the UI element as stereoscopic images or as a monocular image based on whether the UI element is tagged as a non-persistent element or as a persistent element.

A system for displaying images for a HMD is disclosed. The system includes means for generating UI elements for an image. The systems includes means for examining a tag associated with one of the UI elements to determine if the UI element is tagged as a non-persistent or a persistent element. The system further includes means for rendering the UI element as stereoscopic images or as a monocular image based on whether the UI element is tagged as a non-persistent element or as a persistent element.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

System and methods are disclosed to selectively project individual UI elements of display images from stereoscopic HMDs as monocular or stereoscopic images. An UI element may be tagged for rendering as a monocular image—to be projected as a single image, or as a stereoscopic image—to be projected as a left-eye and a right-eye image with a stereo separation to create a perception of depth. Tagging of UI elements as monocular images or stereoscopic images may be based on whether the UI elements are characterized as persistent elements. Persistent elements present information to the user but do not require the user's focused attention. Persistent elements may be rendered as monocular images to allow the user to focus on other UI elements or on the real world while maintaining awareness of information presented by the persistent elements. The HMD may display the monocular images to the user's dominant eye. On the other hand, non-persistent UI elements may require the user's focused attention. Non-persistent UI elements may be rendered as stereoscopic images for projection at a specific depth plane to invite the user's focus.

In one embodiment, tagging of the UI elements for an application is performed at the development time of the application. In one embodiment, tagging of UI elements may be performed at runtime with an option for the developer during application development to override the runtime tag. The tag associated with a UI element may be static or dynamic. A static tag allows the UI element to be statically rendered as either a monocular image or stereoscopic images. A dynamic tag allows the rendering of the UI element to switch between a monocular image and stereoscopic images. For example, a new status message may initially be tagged as a non-persistent UI for display as stereoscopic images to call attention to the user. After a period of time to allow the user to read the message, the status message may be tagged as a persistent UI for display as a background monocular image.

Advantageously, by simultaneously displaying monocular images for persistent UI elements and stereoscopic images for non-persistent UI elements, HMD-wearing users may maintain focus on the real world or on the stereoscopic images at a depth plane without suffering from the double vision effect introduced by other stereoscopic images being projected at different depth planes.

Figure 1:
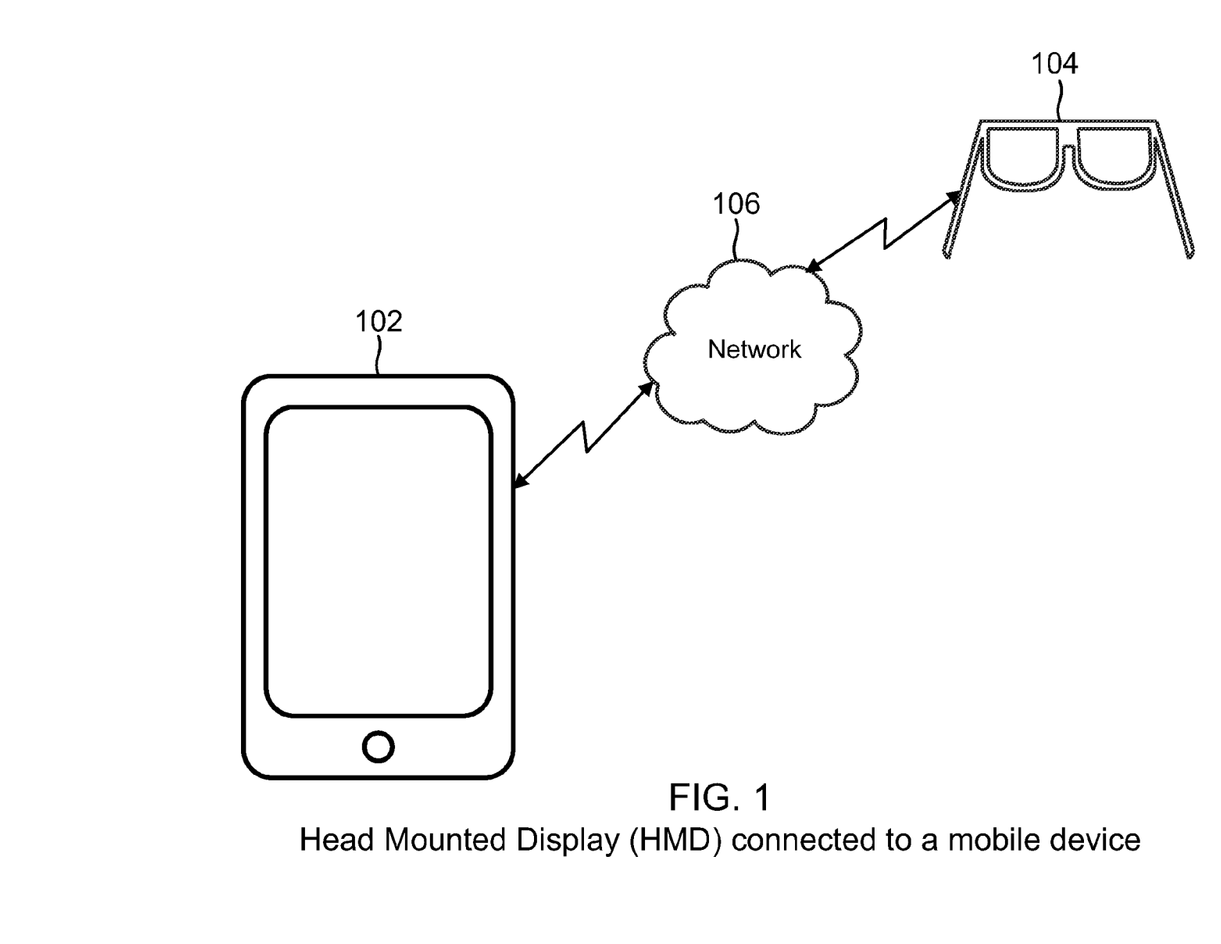
FIG. 1 shows a HMD connected to a computer system to display images according to one embodiment of the subject matter of the present disclosure.

FIG. 1 shows a HMD connected to a computing device to display images according to one embodiment of the subject matter of the present disclosure. A computing device 102 may be a smart phone (e.g., iPhone, Google phone, or other phones running Android. Window Mobile, or other operating systems), a tablet computer (e.g., iPad, Galaxy), personal digital assistant (PDA), a notebook computer, or various other types of wireless or wired computing devices. It should be appreciated that computing device 102 may be referred to as a mobile device without departing from the scope of the present disclosure. Computing device 102 may communicate over a network 102 with HMD 104.

Computing device 102 may run applications that generate display images comprising of UI elements. The UI elements may include application icons, video streams, images, interactive elements, messages, status information, etc. The UI elements may have been tagged for rendering as monocular or stereoscopic images during development of the applications and may be transferred to HMD 108 over network 106. In one or more embodiments, computing device 102 may tag the UI elements during runtime of the application either statically or dynamically. In other embodiments, static tagging may be performed during development time of the application. Dynamic tagging may allow a tag to be dynamically changed during runtime by the application, by configured user preferences, or upon user issued commands. In one or more embodiments, UI elements may be dynamically tagged by HMD 104 by tracking the user's eyes. For example, HMD 104 may change stereoscopic images to monocular images when it determines that the user's eyes are no longer focused on the depth plane of the projected stereoscopic images. Tagging may be based on whether the UI elements are persistent or non-persistent or on other characteristic of the UI elements. In one or more embodiments, UI elements of a certain class or type may be identically tagged. For example, thumb nail sketches of images may be tagged as monocular images by default, and high resolution images may be tagged as stereoscopic images.

HMD 104 may be incorporated into a pair of glasses or a helmet worn by a user of computing device 102. HMD 104 is capable of projecting UI elements as a monocular image to only one eye or as a pair of stereoscopic images, with each image of the stereoscopic pair projected to a different eye. That is, the pair of stereoscopic images may be projected as a left-eye and a right-eye image with a stereo separation between the images to create a perception of depth. In one or more embodiments, a user may configure the dominant eye setting of HMD 104 to specify the preference for the eye with which to view the monocular images. The user may configure other parameters to specify how monocular or stereoscopic images may be displayed, such as the stereo separation between the left-eye and right-eye images of the stereoscopic pair.

HMD 104 may receive the tagged UI elements from computing device 102 and may render the UI elements accordingly. To render an UI element, HMD 104 examines the tag associated with the UI element. If the tag indicates that the UI element is persistent, HMD 104 projects the UI element as a monocular image to one eye chosen by HMD 104, or to the dominant eye as configured by the user. If the tag indicates that the UI element is non-persistent, HMD 104 determines the stereo separation between the two stereoscopic images of the UI element and projects the stereoscopic images. HMD 104 examines the tags of all the UI elements of the current display until all the UI elements are displayed. If the tag for a UI element is changed during application runtime, HMD 104 may re-render the UI element and may project the UI element in accordance with the new tag.

The user wearing HMD 104 may use computing device 102 as a user interface to provide commands to HMD 104. For example, the user may run an application on computing device 102 to configure the dominant eye setting for displays of monocular images, the stereoscopic separation for displays of stereoscopic images, or to change the tags of UI elements for dynamic tagging. The user may also use computing device 102 to select icons displayed by HMD 104, to scroll through images or texts displayed by HMD 104, or to otherwise interact with HMD 104.

Network 106 may be implemented as a single network or a combination of multiple networks. For example, in various embodiments, network 106 may include the Internet and/or one or more intranets, wireless networks (e.g., cellular, wide area network (WAN), WiFi hot spot, WiMax, personal area network (PAN), Bluetooth, etc.), landline networks and/or other appropriate types of communication networks. As such, in various embodiments, computing device 102 may be associated with a particular link (e.g., a link, such as a URL (Uniform Resource Locator) to an IP (Internet Protocol) address).

While computing device 102 is shown as transferring tagged UI elements to HMD 104 for rendering, it is appreciated that the rendering of the UI elements may be performed by computing device 102, or by computing device 102 and HMD 104 combined. Similarly, runtime tagging of the UI elements may be performed by HMD 104, computing device 102, or a combination thereof. It is also appreciated that the functionalities of computing device 102 may be incorporated into HMD 104 so that a user may interact directly with HMD 104 to enter commands without the aid of computing device 102.

Figure 2A:
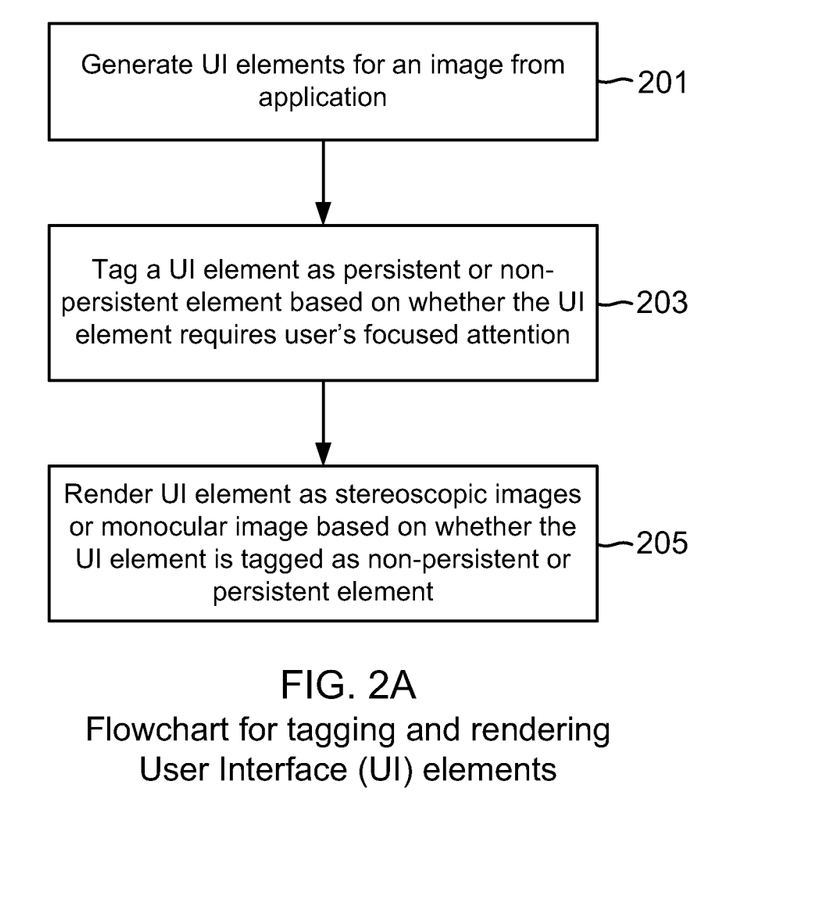
FIG. 2A shows the steps in a flowchart of a process for an application to tag and render UI elements of an image according to one embodiment of the subject matter of the present disclosure.

FIG. 2A shows the steps in a flowchart of a process for an application to tag and render UI elements of an image according to one embodiment of the subject matter of the present disclosure. In 201, an application generates one or more UI elements for an image to be displayed on HMD 104. The UI elements may be generated during development of the application. For example, developers of a video application may generate graphical icons or user interface elements for manipulation by users to view a video. In one or more embodiments, an application may generate the UI elements during runtime of the application. For example, the video application may display a video clip when users run the application.

In 203, the application or computing device 102 running the application tags a UI element from the image as a persistent or as a non-persistent element based on whether the UI element requires a user's focused attention. Tagging may be performed when the application is developed or when the application is executed. UI elements that do not require a user's focused attention may be tagged as persistent elements. UI elements that require a user's focused attention may be tagged as non-persistent elements.

In 205, a display device renders the tagged UI element as stereoscopic images or as a monocular image on the basis of the tag. For example, HMD 104 may render a UI element as a monocular image if the UI element is tagged as a persistent element so that it does not interfere with the user's focused attention elsewhere. On the other hand, HMD 104 may render a UI element as stereoscopic images to invite the user's focused attention if the UI element is tagged as a non-persistent element.

Figure 2B:
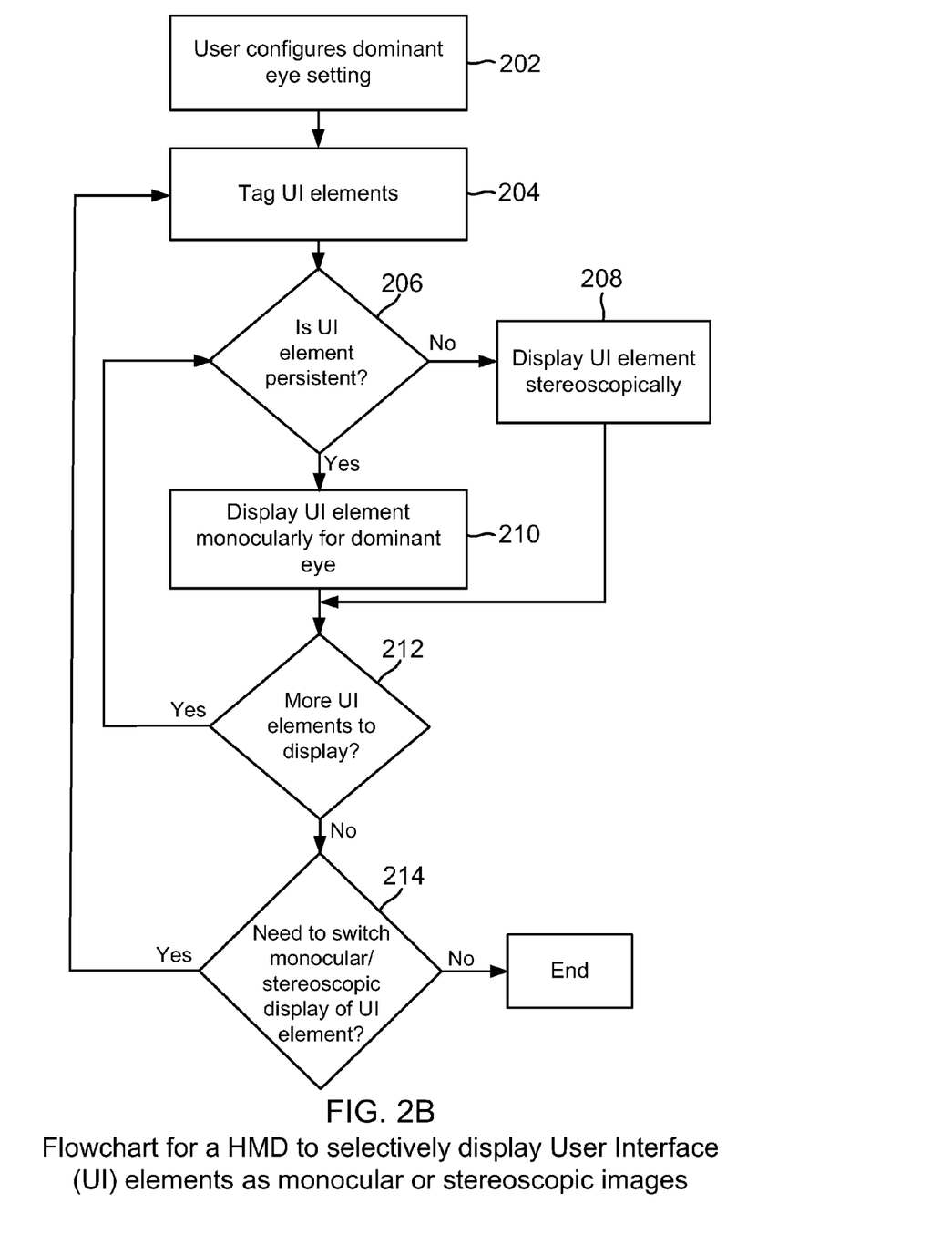
FIG. 2B shows the steps in a flowchart of a process for a HMD to selectively display UI elements as monocular or stereoscopic images according to one embodiment of the subject matter of the present disclosure.

FIG. 2B shows the steps in a flowchart of a process for a HMD of FIG. 1 to selectively display UI elements as monocular or stereoscopic images according to one embodiment of the subject matter of the present disclosure. In 202, a user uses computing device 102 to configure a dominant eye setting for HMD 104. The user may run an application to select the left-eye or the right-eye as the preferred eye for viewing monocular images. In one or more embodiments, the user may also configure the stereo separation between the left-eye and right-eye images used by HMD 104 to project stereoscopic images. In one or more embodiments, the configuration of the dominant eye and/or the stereo separation may be stored in HMD 104 so that the user need only perform such configuration once.

In 204, computing device 104 or HMD 104 generates a list of UI elements to be displayed. The UI elements may be generated from mobile applications running on computing device 104 or from host applications running on HMD 104. For example, the UI elements may include application icons, video streams, images, and/or interactive elements generated by applications or OS running on computing device 104. The UI elements may also include messages, status information, and/or interactive elements from applications or OS running on HMD 104. The UI elements are to be displayed by HMD 104 as either monocular images or stereoscopic images on the basis of the associated tags.

In one or more embodiments, the UI elements are tagged during development time of the applications that generate the UI elements. In one or more embodiments, the UI elements are tagged during runtime of the applications by computing device 102 or HMD 104 when the UI elements from the applications are displayed. In one or more embodiments, tagging of UI elements may be performed at runtime with an option for the developer during application development to override the runtime tag. Tagging of UI elements may be based on whether the UI elements are characterized as persistent elements. Persistent elements do not require the user's focused attention so that they may be rendered as monocular images to allow the user to focus on other UI elements or on the real world while maintaining awareness of information presented by the persistent elements. Non-persistent UI elements require the user's focused attention so that they may be rendered as stereoscopic images at a depth plane determined by the stereoscopic separation for focused viewing by the user. In one or more embodiments, tagging of UI elements may be based on the class or type of the UI elements. For example, UI elements that receive user input may be tagged for rendering as stereoscopic images, and UI elements that do not receive user input may be tagged for rendering as monocular images.

In 206, HMD 104 examines the tag associated with each UI element to determine if the UI element is to be displayed as a monocular image or as stereoscopic images. In 208, if the tag indicates that the UI element is non-persistent, HMD 104 renders the UI elements as a pair of stereoscopic images with a stereo separation between the two images. HMD 104 projects one image of the stereoscopic pair for the left-eye and the other image for the right-eye to create an illusion of a depth. The stereo separation may be configured by the user, by developers or content creators of the applications, or may be determined by HMD 104.

In 210, if the tag indicates that the UI element is persistent, the HMD renders the UI element as a single image. HMD 104 projects the monocular image to the dominant eye. The dominant eye may be configured by the user or may be determined by HMD 104. By simultaneously displaying persistent UI elements as monocular images and non-persistent UI elements as stereoscopic images in the same field of view, the user may maintain focus on the real world or on the non-persistent stereoscopic UI elements without the double vision effect introduced by other non-persistent stereoscopic UI elements at different depth planes. In 212, HMD 104 determines if there are more UI elements to display. If there are additional UI elements, HMD 104 examines the additional UI elements until all UI elements in the field of view are displayed as monocular images or stereoscopic images.

In 214, computing device 102 and/or HMD 104 determine if any of the UI elements needs to be dynamically retagged. Dynamic tagging allows the display of an UI element as a monocular image or stereoscopic images to be dynamically changed during application runtime by the application, by configured user preferences, or upon user issued commands. In one or more embodiments, the non-persistent tag of an UI element may have a duration time. For example, a new status message may initially be tagged as a non-persistent UI for display as stereoscopic images to call attention to the user. The stereoscopic images may be displayed for a length of a duration time to allow the user to read the message. At the expiration of the duration time, the status message may be tagged as a persistent UI for display as a background monocular image.

In one or more embodiments, HMD 104 may track a user's eyes to dynamically tag the UI elements. For example, an UI element may initially be tagged as a non-persistent element for rendering as stereoscopic images. HMD 104 may project the stereoscopic images of the UI element at a specific depth plane. If HMD 104, by tracking the user's eyes, detects that the user has shifted his/her focus from the depth plane of the UI element to the real world at a different depth plane, HMD 104 may change the tag the of the UI element to a persistent element for HMD 104 to render and project the UI element as a monocular image. When, at a later time, HMD 104 detects that the user has shifted his/her focus away from the real world, HMD 104 may retag the UI element back to a non-persistent element for rendering as stereoscopic images. HMD 104 may again project the stereoscopic images of the UI element at the original depth plane. In one or more embodiments, a user may command HMD 104 to change the tag on an UI element if the user wishes to switch between the monocular/stereoscopic images of the UI element.

Figure 3:
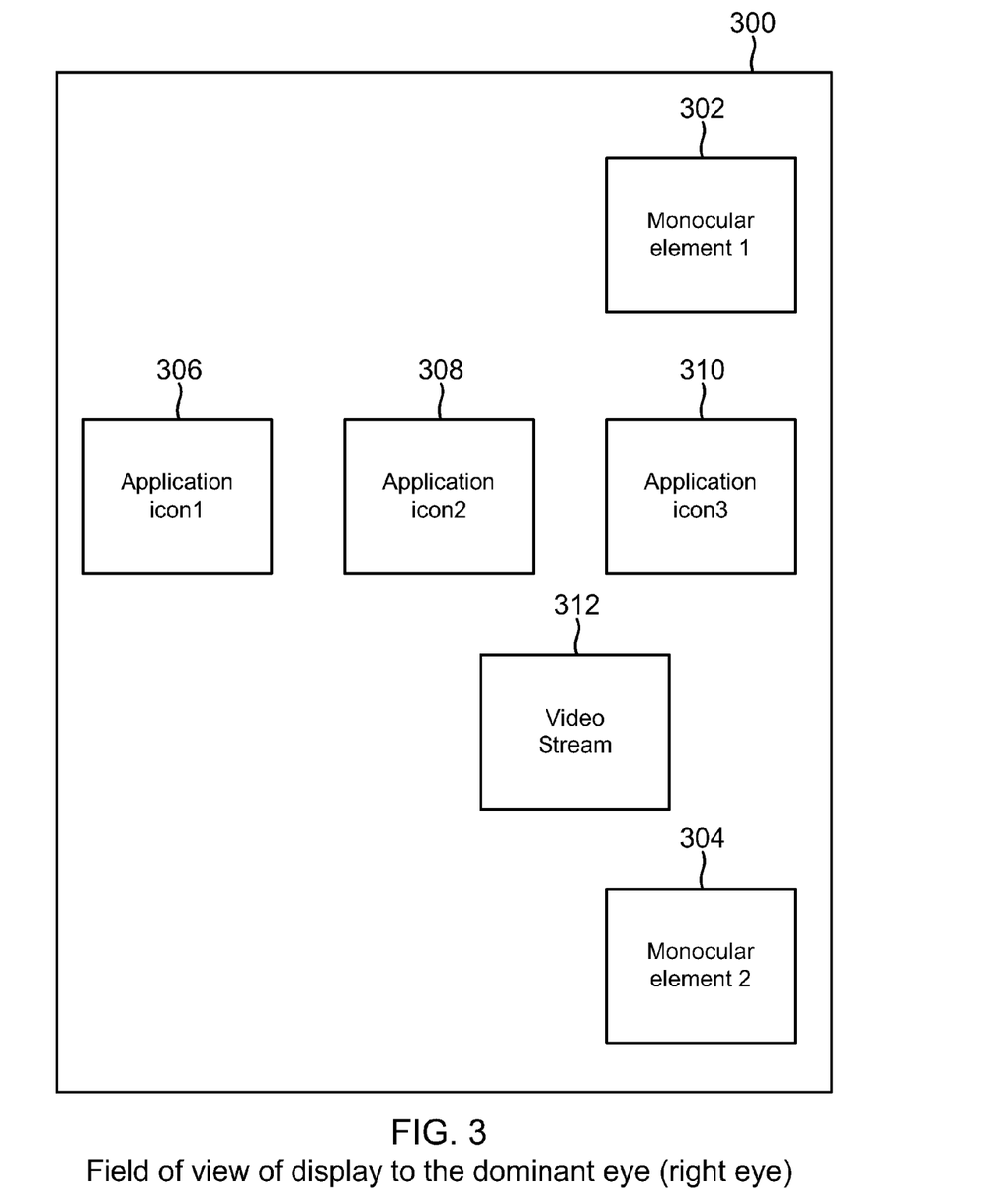
FIG. 3 shows an exemplary field of view of a display of a HMD for the dominant right eye of a user according to one embodiment of the subject matter of the present disclosure.
Figure 4:
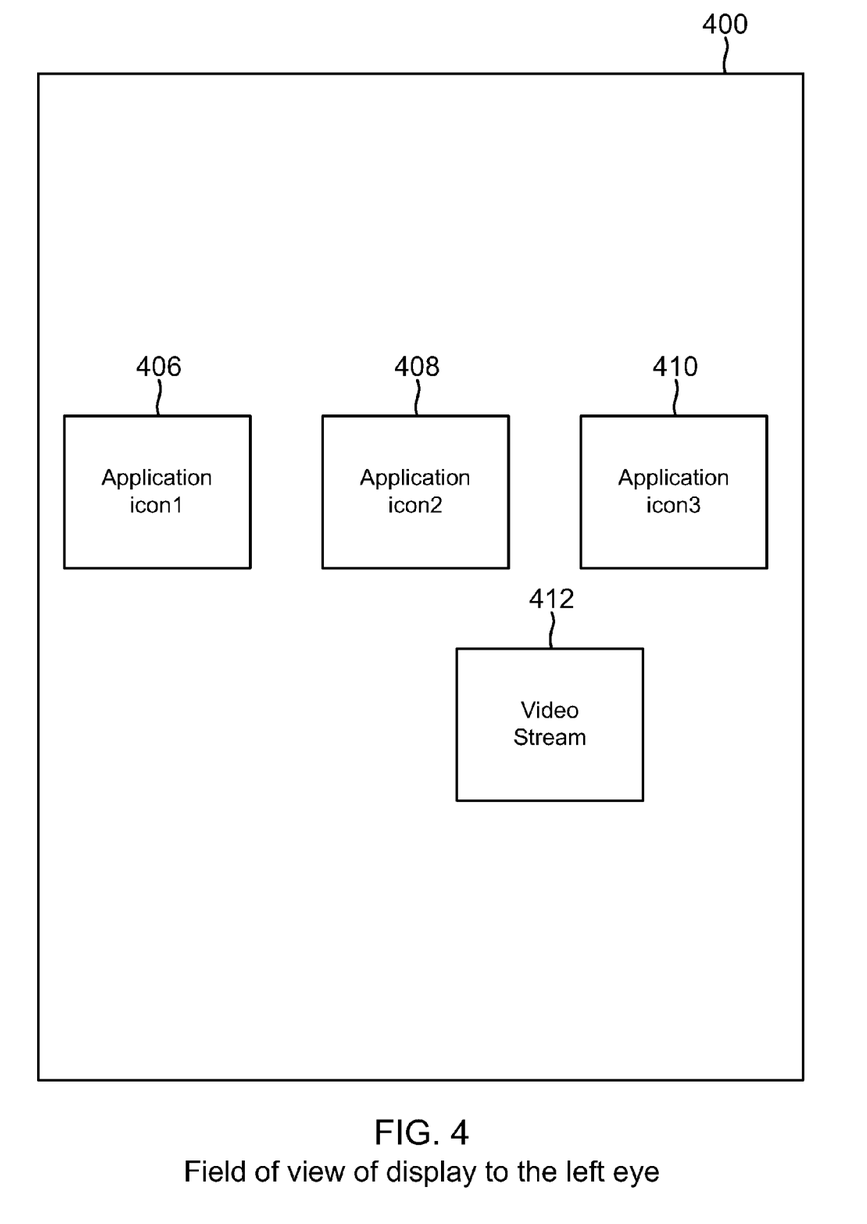
FIG. 4 shows an exemplary field of view of a display of a HMD for the left eye of a user according to one embodiment of the subject matter of the present disclosure.

FIG. 3 shows an exemplary field of view of a display of a HMD of FIG. 1 for the dominant right eye of a user according to one embodiment of the subject matter of the present disclosure. FIG. 4 shows an exemplary field of view of the same display for the left eye of a user according to one embodiment of the subject matter of the present disclosure. A display 300 of FIG. 3 includes a first monocular UI element 302 displayed as a monocular image on the upper right corner and a second monocular UI element 304 displayed as another monocular image on the lower right corner for the dominant right eye of a user. The monocular UI elements are persistent UI elements that may provide status information of HMD 104 in the background when the user is likely to maintain eye focus on a different part of the display or on the real world. For example, the monocular UI elements may display a current time, date, or the battery level of HMD 104.

Display 300 also includes three applications icons 306, 308, 310, and a video stream 312 near the center that are displayed as right-eye images of pairs of stereoscopic images. A display 400 of FIG. 4 includes application icons 406, 408, 410, and video stream 412 that are displayed as left-eye images of the pairs of stereoscopic images. The user may focus on the stereoscopic video stream projected as the pair of right-eye image 312 and left-eye image 412 to view the streaming video. The video stream is non-persistent because after the streaming video finishes playing, it is removed from display 300. Similarly, the user may focus on the stereoscopic application icons projected as image pairs 306/406, 308/408, and 310/410 to select one of the application icons through a user input mechanism. After the user selects one of the application icons, one or more of the three application icons may be removed from display 300. By displaying the UI elements in a combination of monocular and stereoscopic elements, HMD 104 allows the user to focus on the stereoscopic elements of the display or on the real world without the user experiencing a double vision effect from the monocular UI elements.

Figure 5:
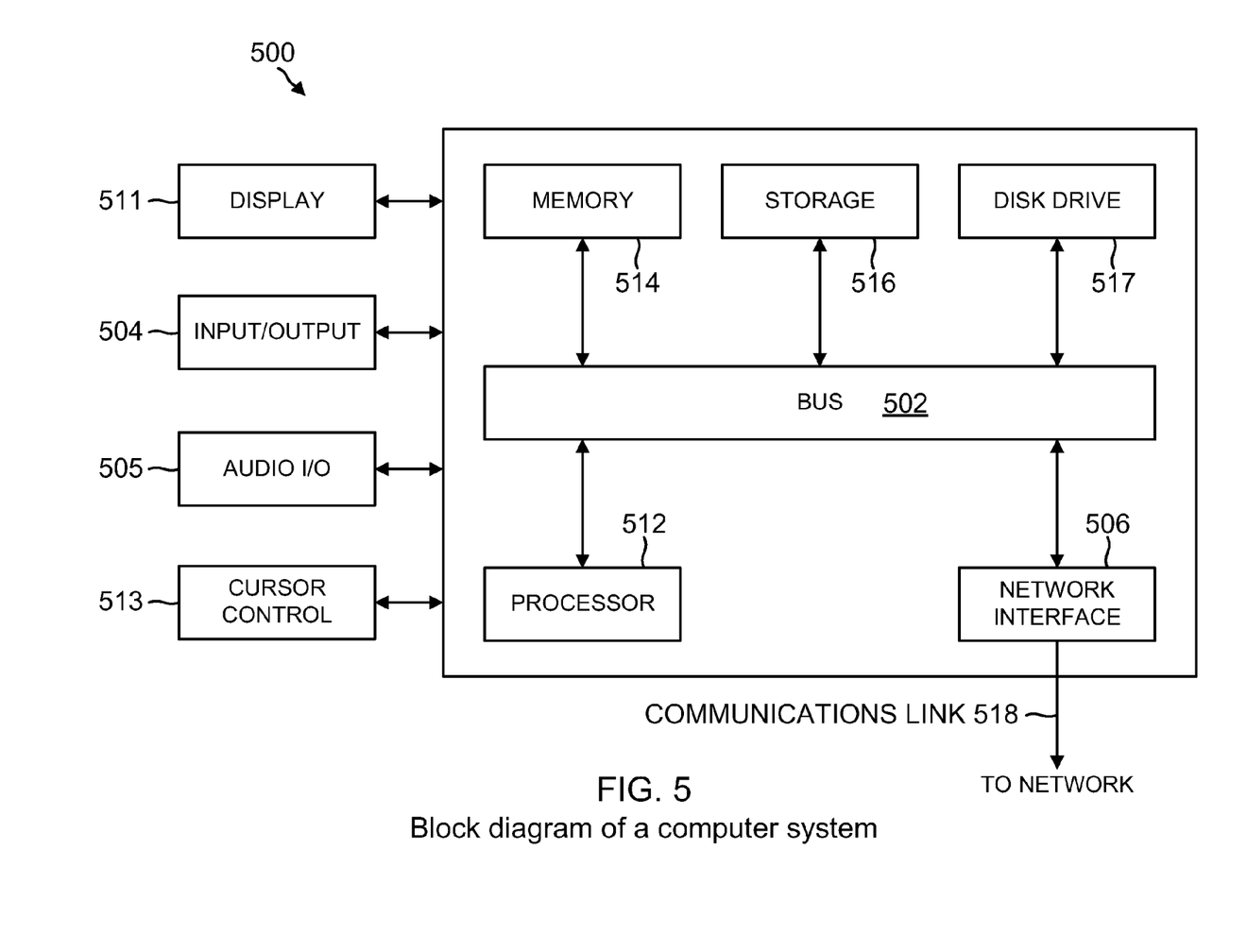
FIG. 5 is a block diagram of a computer system suitable for implementing the computing device or the HMD of FIG. 1 according to one embodiment of the subject matter of the present disclosure.

FIG. 5 is a block diagram of a computer system 500 suitable for implementing computing device 102 or HMD 104 of FIG. 1 according to one embodiment of the subject matter of the present disclosure. In various implementations, computing device 102 of the user may comprise a personal computing device (e.g., smart phone, a computing tablet, a personal computer, laptop, PDA, Bluetooth device, key FOB, badge, etc.) capable of communicating with the network. Similarly, HMD 104 may comprise a personal computing device incorporated into a pair of glasses or a helmet. Computing device 102 or HMD 104 may comprise or implement a plurality of hardware components and/or software components that operate to perform various methodologies in accordance with the described embodiments. Exemplary computing device 102 or HMD 104 may include, for example, stand-alone and networked computers running mobile OS.

Computer system 500 includes a bus 502 or other communication mechanism for communicating information data, signals, and information between various components of computer system 500. Components include an input/output (I/O) component 504 that processes a user action, such as selecting keys from a virtual keypad/keyboard, selecting one or more buttons or links, etc., and sends a corresponding signal to bus 502. I/O component 504 may also include an output component such as a display 511 of HMD 104 mounted a short distance in front of the user's eyes, and an input control such as a cursor control 513 (such as a virtual keyboard, virtual keypad, virtual mouse, etc.). An optional audio input/output component 505 may also be included to allow a user to use voice for inputting information by converting audio signals into information signals. Audio I/O component 505 may allow the user to hear audio. A transceiver or network interface 506 transmits and receives signals between computer system 500 and other devices, such as another user device, or another network computing device via a communication link 518 to a network. In one embodiment, the transmission is wireless, although other transmission mediums and methods may also be suitable. A processor 512, which can be a micro-controller, digital signal processor (DSP), or other processing component, processes these various signals, such as for display on computer system 500 or transmission to other devices via communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical, or magnetic disks, or solid-state drives; volatile media includes dynamic memory, such as system memory component 514; and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, firmware, or combinations thereof. Also where applicable, the various hardware components, software components, and/or firmware components set forth herein may be combined into composite components comprising software, firmware, hardware, and/or all without departing from the spirit of the present disclosure. Where applicable, the various hardware components, software components, and/or firmware components set forth herein may be separated into sub-components comprising software, firmware, hardware, or all without departing from the spirit of the present disclosure. In addition, where applicable, it is contemplated that software components may be implemented as hardware components, and vice-versa. Where applicable, the ordering of various steps described herein may be changed, combined into composite steps, and/or separated into sub-steps to provide features described herein.

Although embodiments of the present disclosure have been described, these embodiments illustrate but do not limit the disclosure. For example, although tagging, rendering, and projection of UI elements for HMD 104 are illustrated using computing device 102 in communication with HMD 104, embodiments of the present disclosure may encompass HMD 104 that incorporates the functionalities of computing device 102. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

What is claimed is:

1. A method for displaying an image for a head mounted display (HMD), comprising:
    generating one or more user interface (UI) elements for the image from an application;
    tagging an UI element as a non-persistent element or as a persistent element based on whether the UI element requires a user's focused attention;
    rendering the UI element as stereoscopic images or as a monocular image based on whether the UI element is tagged as a non-persistent element or as a persistent element; and
    re-tagging the UI element to change the UI element from the persistent element to the non-persistent element and vice versa, and rendering the UI element based on said re-tagging.

2. The method of claim 1, wherein said tagging an UI element as a non-persistent element or as a persistent element comprises tagging the UI element as a non-persistent element if the UI element requires the user's focused attention.

3. The method of claim 1, wherein said tagging an UI element as a non-persistent element or as a persistent element comprises tagging the UI element as a persistent element if the UI element does not require the user's focused attention.

4. The method of claim 1, wherein said rendering the UI element as stereoscopic images or as a monocular image comprises rendering the UI element as stereoscopic images if the UI element is tagged as a non-persistent element.

5. The method of claim 4, wherein said rendering the UI element as stereoscopic images comprises generating two images of the UI element, wherein the two images are separated by a stereo separation.

6. The method of claim 1, wherein said rendering the UI element as stereoscopic images or as a monocular image comprises rendering the UI element as a monocular image if the element is tagged as a persistent element.

7. The method of claim 1, further comprising:
    projecting the monocular image of the UI element for one eye of the user if the UI element is tagged as a persistent element.

8. The method of claim 7, further comprising configuring the HMD for a dominant eye of the user, and wherein said projecting the monocular image of the UI element comprises projecting the monocular image for the dominant eye of the user.

9. The method of claim 7, further comprising repeating said tagging, rendering, and projecting for each UI element of the image.

10. The method of claim 9, further comprising projecting at least one monocular image and at least one pair of stereoscopic images simultaneously in the image.

11. The method of claim 1, further comprising:
    projecting the stereoscopic images of the UI element for both eyes of the user if the UI element is tagged as a non-persistent element.

12. The method of claim 1, wherein said tagging is performed during a development time of the application generating the UI element.

13. The method of claim 1, wherein said tagging is performed when the user runs the application generating the UI element.

14. The method of claim 1, wherein if the UI element comprises an interactive element for the user, said tagging comprises tagging the UI element as a non-persistent element.

15. A method for displaying an image for a head mounted display (HMD), comprising:
    generating one or more user interface (UI) elements for the image from an application;
    tagging an UI element as a non-persistent element or as a persistent element based on whether the UI element requires a user's focused attention; and
    rendering the UI element as stereoscopic images or as a monocular image based on whether the UI element is tagged as a non-persistent element or as a persistent element,
    wherein if the UI element comprises status information of the HMD, said tagging comprises tagging the UI element as a persistent element.

16. The method of claim 15, wherein said tagging an UI element as a non-persistent element or as a persistent element comprises tagging the UI element as a non-persistent element if the UI element requires the user's focused attention.

17. The method of claim 15, wherein said tagging an UI element as a non-persistent element or as a persistent element comprises tagging the UI element as a persistent element if the UI element does not require the user's focused attention.

18. The method of claim 15, wherein said rendering the UI element as stereoscopic images or as a monocular image comprises rendering the UI element as stereoscopic images if the UI element is tagged as a non-persistent element.

19. The method of claim 15, wherein said rendering the UI element as stereoscopic images or as a monocular image comprises rendering the UI element as a monocular image if the element is tagged as a persistent element.

20. An apparatus, comprising:
a memory; and
one or more processors coupled to the memory and configured to:
generate one or more user interface (UI) elements for an image;
examine a tag associated with an UI element; and
render the UI element as stereoscopic images or as a monocular image based on whether the UI element is tagged as a non-persistent element or as a persistent element,
wherein if the UI element comprises status information of the HMD, the UI element is tagged as a persistent element.

21. The apparatus of claim 20, wherein the one or more processors are configured to render the UI elements by being further configured to render the UI element as stereoscopic images if the UI element is tagged as a non-persistent element.

22. The apparatus of claim 21, wherein the one or more processors are configured to render the UI element as stereoscopic images by being further configured to generate two images of the UI element, wherein the two images are separated by a stereo separation.

23. The apparatus of claim 20, wherein the one or more processors are configured to render the UI elements by being further configured to render the UI element as a monocular image if the element is tagged as a persistent element.

24. The apparatus of claim 20, further comprising a display medium, and wherein the one or more processors are further configured to project the stereoscopic images or the monocular image on the display medium.

25. The apparatus of claim 24, wherein the one or more processors are configured to project the stereoscopic images or the monocular image by being further configured to project the stereoscopic images for both eyes of a user.

26. The apparatus of claim 24, wherein the one or more processors are configured to project the stereoscopic images or the monocular image by being further configured to project the monocular image for one eye of a user.

27. The apparatus of claim 26, wherein the one or more processors are further configured to receive a setting for a dominant eye of the user.

28. The apparatus of claim 27, wherein the one or more processors are configured to project the monocular image for one eye of the user by being further configured to project the monocular image for the dominant eye.

29. The apparatus of claim 24, wherein the one or more processors are further configured to examine a tag associated with each of UI elements for the image, to render each of the UI elements as stereoscopic images or as a monocular image, and to project the stereoscopic images or the monocular image for each of the UI elements on the display medium.

30. The apparatus of claim 29, wherein the image comprises at least one monocular image and at least one pair of stereoscopic images.

31. An apparatus comprising:
a display medium;
a memory; and
one or more processors coupled to the memory and configured to:
generate one or more user interface (UI) elements for an image;
examine a tag associated with an UI element;
render the UI element as stereoscopic images or as a monocular image based on whether the UI element is tagged as a non-persistent element or as a persistent element;
project the stereoscopic images or the monocular image on the display medium; and
examine the tag associated with the UI element to detect if the tag changes, to render the UI element as stereoscopic images or as a monocular image based on a changed tag, and to project the stereoscopic images or the monocular image based on the changed tag on the display medium.

32. A non-transitory computer-readable medium comprising a plurality of machine-readable instructions which, when executed by one or more processors, are adapted to cause the one or more processors to perform a method comprising:
generating one or more user interface (UI) elements for an image;
examining a tag associated with an UI element; and
rendering the UI element as stereoscopic images or as a monocular image based on whether the UI element is tagged as a non-persistent element or as a persistent element;
projecting the stereoscopic images or the monocular image; and
examining the tag associated with the UI element to detect if the tag changes, rendering the UI element as stereoscopic images or as a monocular image based on a changed tag, and projecting the stereoscopic images or the monocular image based on the changed tag.

33. The non-transitory computer-readable medium of claim 32, wherein said rendering the UI element as stereoscopic images or as a monocular image comprises rendering the UI element as stereoscopic images if the UI element is tagged as a non-persistent element.

34. The non-transitory computer-readable medium of claim 33, wherein said rendering the UI elements as stereoscopic images comprises generating two images of the UI element, wherein the two images are separated by a stereo separation.

35. The non-transitory computer-readable medium of claim 32, wherein said rendering the UI element as stereoscopic images or as a monocular image comprises rendering the UI element as a monocular image if the element is tagged as a persistent element.

36. The non-transitory computer-readable medium of claim 32, wherein said projecting the stereoscopic images or the monocular image comprises projecting the stereoscopic images for both eyes of a user.

37. The non-transitory computer-readable medium of claim 32, wherein said projecting the stereoscopic images or the monocular image comprises projecting the monocular image for one eye of a user.

38. The non-transitory computer-readable medium of claim 37, wherein said projecting the monocular image for one eye of the user comprises projecting the monocular image for a dominant eye of the user.

39. The non-transitory computer-readable medium of claim 32, wherein the method further comprises repeating said examining, rendering, and projecting for each element of the image.

40. The non-transitory computer-readable medium of claim 39, wherein the image comprises at least one monocular image and at least one pair of stereoscopic images.

41. A system for displaying an image for a head mounted display (HMD), comprising:
  means for generating one or more user interface (UI) elements for the image;
  means for examining a tag associated with an UI element to detect if the tag changes;
  means for rendering the UI element as stereoscopic images or as a monocular image based on whether the UI element is tagged as a non-persistent element or as a persistent element based on a changed tag; and
  means for projecting the stereoscopic images or the monocular image based on the changed tag.

42. The system of claim 41, wherein the means for rendering the UI element as stereoscopic images or as a monocular image comprises means for rendering the UI element as stereoscopic images if the UI element is tagged as a non-persistent element.

43. The system of claim 42, wherein the means for rendering the UI elements as stereoscopic images comprises means for generating two images of the UI element, wherein the two images are separated by a stereo separation.

44. The system of claim 41, wherein the means for rendering the UI element as stereoscopic images or as a monocular image comprises means for rendering the UI element as a monocular image if the element is tagged as a persistent element.

45. The system of claim 41, wherein the means for projecting the stereoscopic images or the monocular image comprises means for projecting the stereoscopic images of the UI element for both eyes of a user.

46. The system of claim 41, wherein the means for projecting the stereoscopic images or the monocular image comprises means for projecting the monocular image of the UI element for one eye of a user.

47. The system of claim 46, further comprising means for configuring the HMD for a dominant eye of the user, and wherein the means for projecting the monocular image of the UI element comprises means for projecting the monocular image for the dominant eye of the user.

48. The system of claim 41, wherein the means for examining comprises means for examining a tag associated with each of the UI elements for the image, wherein the means for rendering comprises means for rendering each of the UI elements as stereoscopic images or as a monocular image, and wherein the means for projecting comprises means for projecting the stereoscopic images or the monocular image for each of the UI elements.

49. The system of claim 48, wherein the image comprises at least one monocular image and at least one pair of stereoscopic images.

50. An apparatus, comprising:
  a memory; and
  one or more processors coupled to the memory and configured to:
    generate one or more user interface (UI) elements for the image from an application;
    tag an UI element as a non-persistent element or as a persistent element based on whether the UI element requires a user's focused attention;
    render the UI element as stereoscopic images or as a monocular image based on whether the UI element is tagged as a non-persistent element or as a persistent element; and
    re-tag the UI element to change the UI element from the persistent element to the non-persistent element and vice versa, and render the UI element based on re-tagging the UI element.

51. The apparatus of claim 50, wherein the one or more processors configured to tag an UI element as a non-persistent element or as a persistent element comprises one or more processors configured to tag the UI element as a non-persistent element if the UI element requires the user's focused attention.

52. The apparatus of claim 50, wherein the one or more processors configured to tag an UI element as a non-persistent element or as a persistent element comprises one or more processors configured to tag the UI element as a persistent element if the UI element does not require the user's focused attention.

53. The apparatus of claim 50, wherein the one or more processors configured to render the UI element as stereoscopic images or as a monocular image comprises one or more processors configured to render the UI element as stereoscopic images if the UI element is tagged as a non-persistent element.

54. The apparatus of claim 50, wherein the one or more processors configured to render the UI element as stereoscopic images or as a monocular image comprises one or more processors configured to render the UI element as a monocular image if the element is tagged as a persistent element.

* * * * *